(12) United States Patent
Wozniak et al.

(10) Patent No.: US 10,901,951 B2
(45) Date of Patent: Jan. 26, 2021

(54) MEMORY COMPACTION FOR APPEND-ONLY FORMATTED DATA IN A DISTRIBUTED STORAGE NETWORK

(71) Applicant: International Business Machines Corporation, Armonk, NY (US)

(72) Inventors: Ethan S. Wozniak, Park Ridge, IL (US); Praveen Viraraghavan, Chicago, IL (US); Ilya Volvovski, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 371 days.

(21) Appl. No.: 16/037,757

(22) Filed: Jul. 17, 2018

(65) Prior Publication Data

US 2020/0026780 A1    Jan. 23, 2020

(51) Int. Cl.
*G06F 16/18* (2019.01)
*G06F 16/174* (2019.01)
*G06F 16/182* (2019.01)

(52) U.S. Cl.
CPC ...... *G06F 16/1744* (2019.01); *G06F 16/1805* (2019.01); *G06F 16/1824* (2019.01)

(58) Field of Classification Search
CPC . G06F 16/1805; G06F 16/181; G06F 16/1815
See application file for complete search history.

(56) References Cited

U.S. PATENT DOCUMENTS

| | | | |
|---|---|---|---|
| 2005/0216534 A1* | 9/2005 | Ikezawa | G06F 16/181 |
| 2011/0078407 A1* | 3/2011 | Lewis | G06F 16/1815 |
| | | | 711/213 |
| 2013/0262412 A1 | 10/2013 | Hawton et al. | |
| 2015/0058306 A1* | 2/2015 | Earl | H04L 67/1097 |
| | | | 707/703 |
| 2016/0378078 A1 | 12/2016 | Lamparter et al. | |
| 2017/0315740 A1* | 11/2017 | Corsi | G06F 3/0688 |
| 2019/0205437 A1* | 7/2019 | Larson | G06F 3/06 |

FOREIGN PATENT DOCUMENTS

| | | |
|---|---|---|
| CN | 105511812 A | 4/2016 |
| WO | 2016091138 A1 | 6/2016 |

* cited by examiner

*Primary Examiner* — Kris E Mackes
(74) *Attorney, Agent, or Firm* — James Nock; Andrew D. Wright; Roberts Calderon Safran & Cole, P.C.

(57) ABSTRACT

A processing module of a memory storage unit includes an interface configured to interface and communicate with a communication system, a memory that stores operational instructions, and processing circuitry operably coupled to the interface and to the memory that is configured to execute the operational instructions to manage data stored using append-only formatting. When the processing module determines that a section of the memory includes invalid data and the amount of invalid data compares unfavorably to a predetermined limit, the processing module determines a rate for execution of a compaction routine for the section of memory, where the rate is based on a proportion, integral and derivative (PID) function that is based on a target usage level of the memory and a current usage level of the memory.

20 Claims, 7 Drawing Sheets

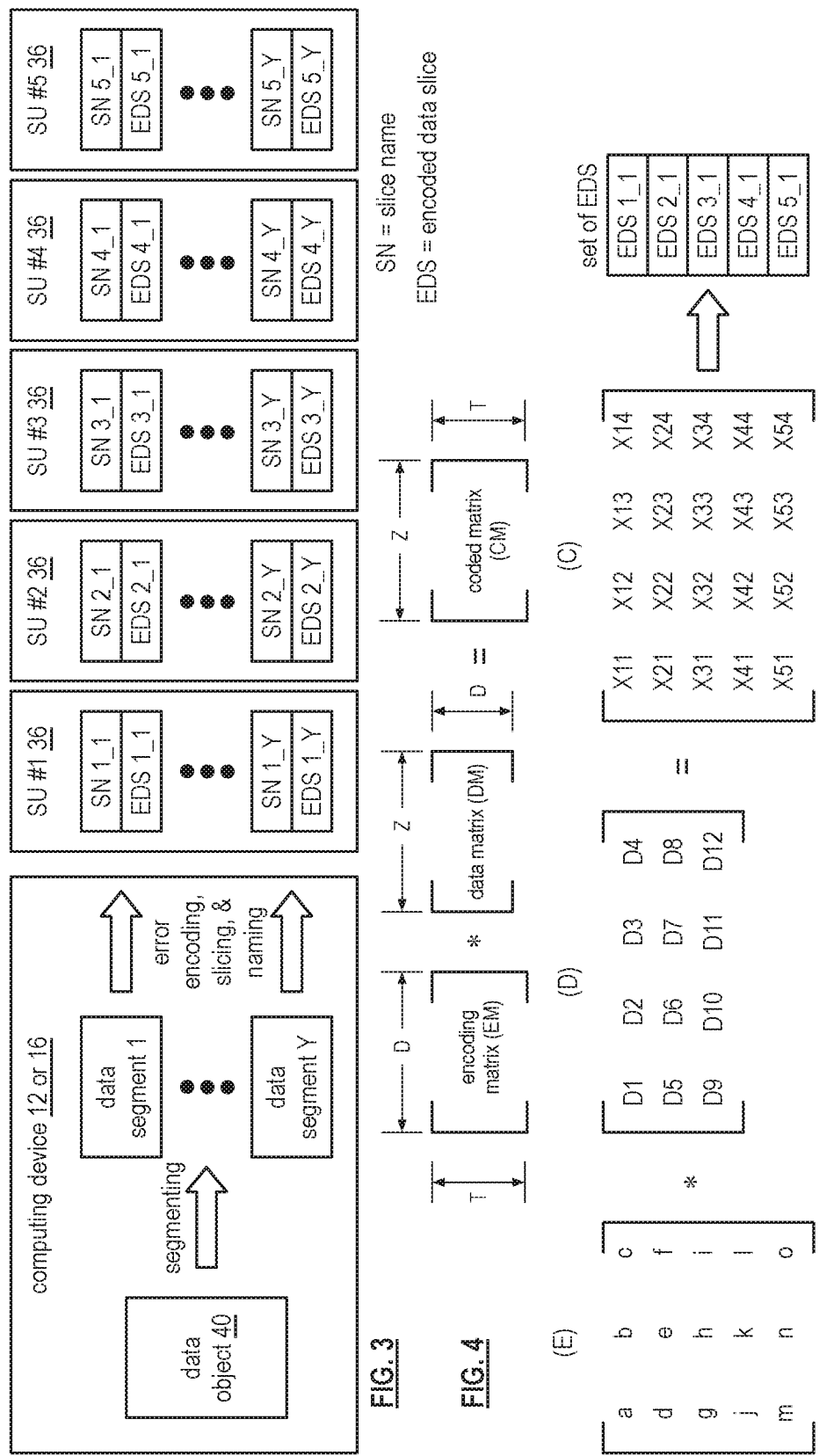

MEMORY COMPACTION FOR APPEND-ONLY FORMATTED DATA IN A DISTRIBUTED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to compaction of dispersed error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Memory systems may use a variety of storage formats, including append-only formats to improve the write efficiency of memory devices. Storing data in append-only formatted systems may result in gaps in memory device storage. In order to reclaim the memory storage space occupied by the gaps compaction procedures may be used to improve the storage efficiency of the affected memory devices. Compaction procedures may in turn increase the workload on the memory devices, impacting read-write efficiency unfavorably. The compaction procedures may be controlled using a throttling mechanism that adjusts the compaction procedure based on changes to the current usage level(s) and a target usage level of the memory device.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
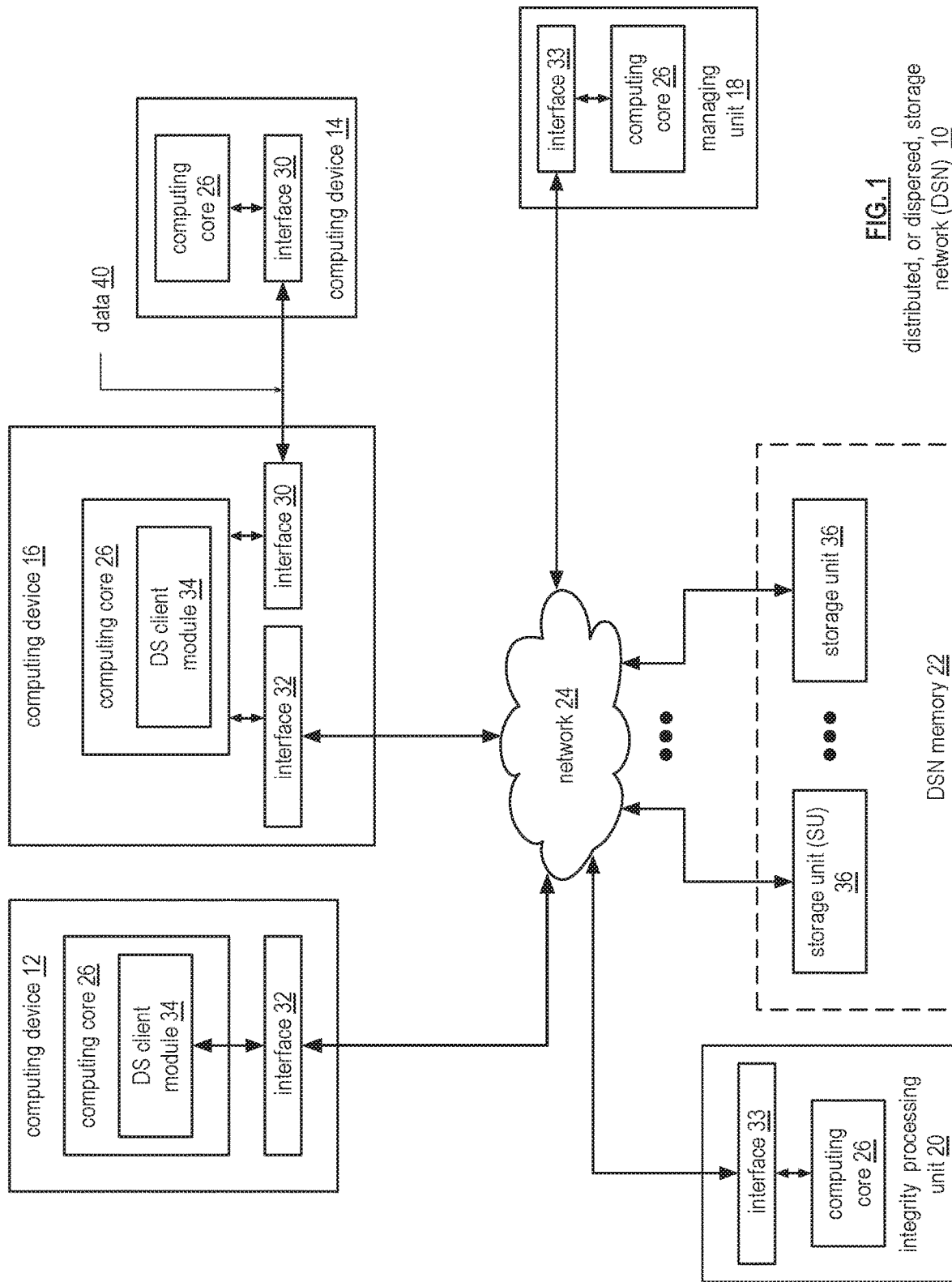
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
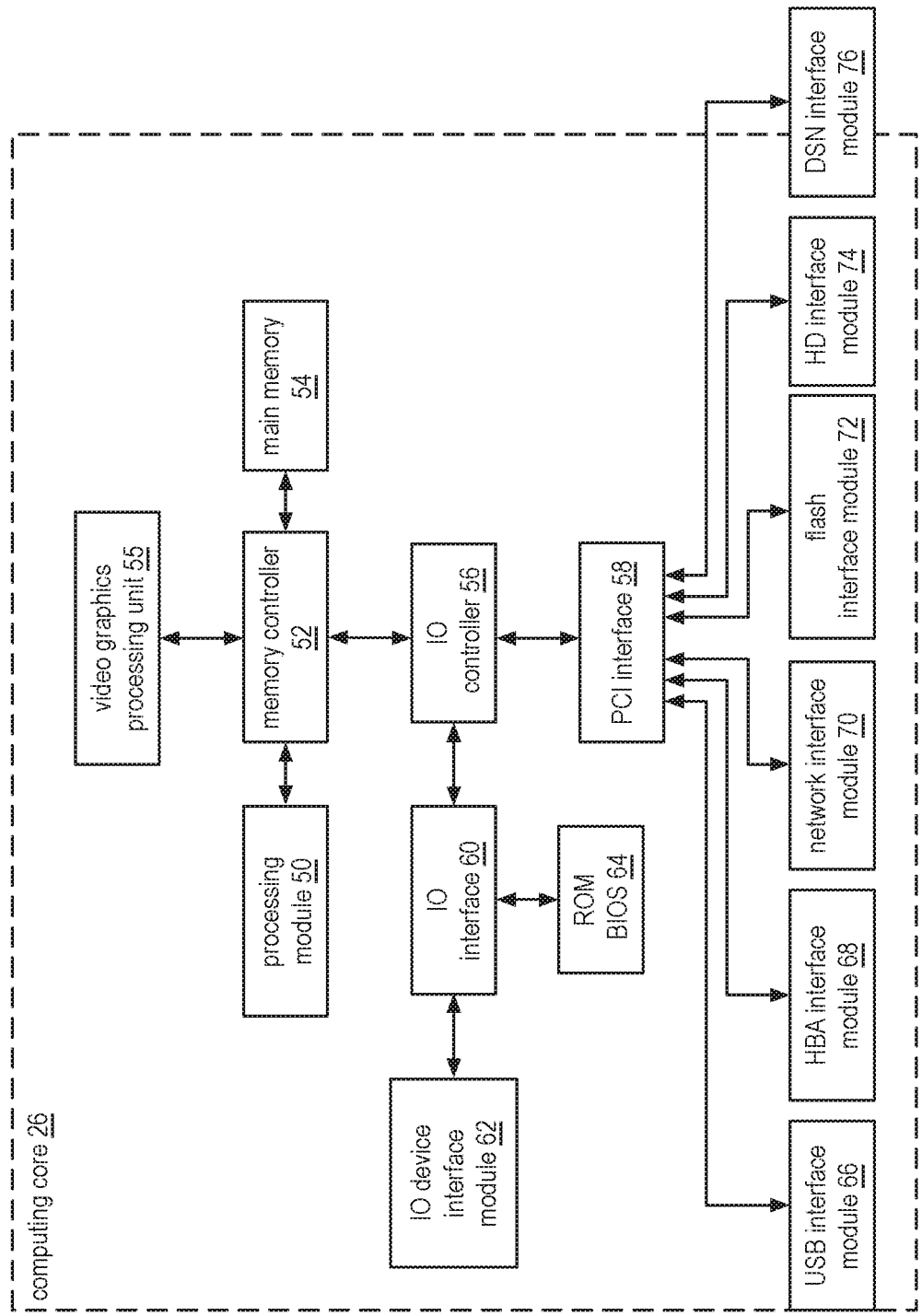
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
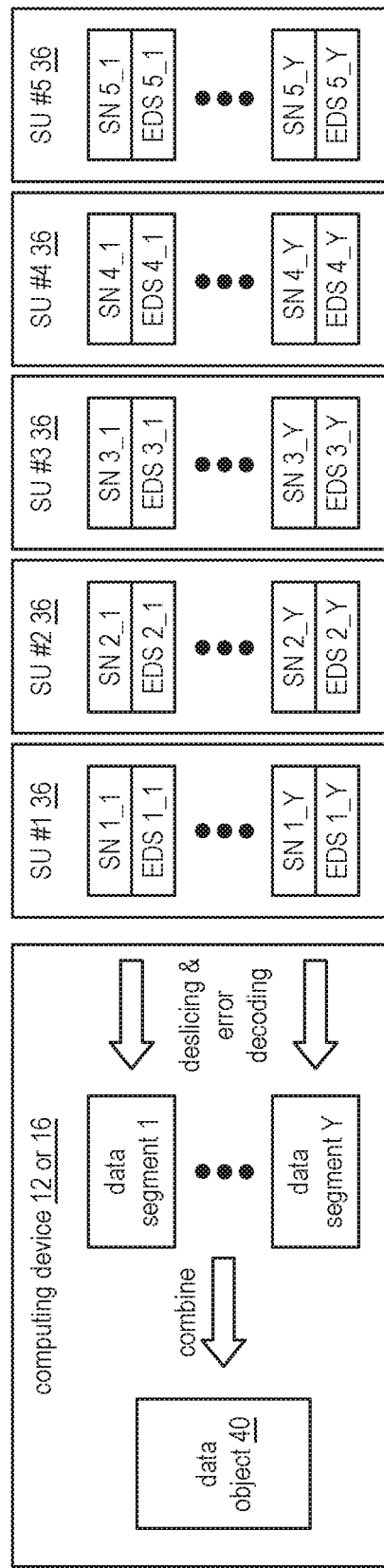
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
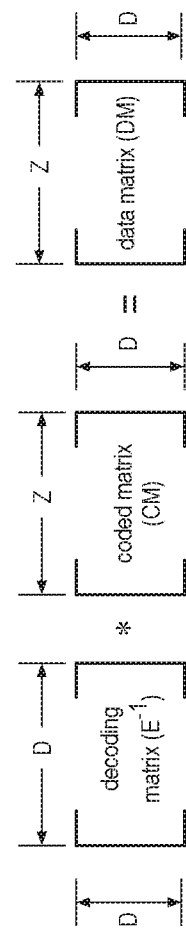
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Memory devices in storage units (SUs) can be configured to store data in append-only formats such as, for example, a log structured format. In log structured file systems, a log can be maintained within the file system itself, and the file system can write data and metadata to the tail of the log. Data blocks, once written, are not written on, until they are completely erased. Append-only formats can improve the write efficiency of individual storage units and the DSN generally.

One characteristic of append-only formatted systems is that deletions of data can result in gaps in memory devices. In order to reclaim the memory storage space occupied by the gaps, a given SU can be configured to perform a compaction procedure where a section of data with gaps in the memory is read from that section and written into a new section of the memory without the gaps. The compaction procedure or compaction routine can be triggered using on a determination function based on various measures of memory storage efficiency. For example, the determination function may trigger data compaction based on 1) the amount of available space on the memory compared to the memory capacity; 2) the amount of memory space that can be reclaimed or recaptured by the compaction routine; 3) the total available space on the memory irrespective of capacity; 4) a measure of current fragmentation (is effectively unusable because it is divided into pieces that are too small to be used individually by the SU); and 5) other factors related to data storage.

Compaction routines increase the workload on the memory devices as they read data from sections of data stored in the memory devices and write the data to other sections of the memory devices (or write to one or more other memory devices in the SU). Accordingly, the compaction routines can cause delays in other memory storage functions, such requests from the DSN to read and/or write data to those memory devices. When storage operations require responses from a plurality of memory devices in the SU the accordant delays can be magnified. In an example, if a particular memory device in a given SU is undergoing compaction 20 percent of the time (i.e. a compaction routine is running 20 percent of the time) the overall delay for an operation that requires responses from that memory device is a maximum of 20 percent. However, if the same operation requires responses from 10 of 10 available memories in the SU the delay could be $1-((1-0.2)^{10})=89\%$ (in other words, 89% of requests to those memory devices will experience some sort of delay).

Figure 9:
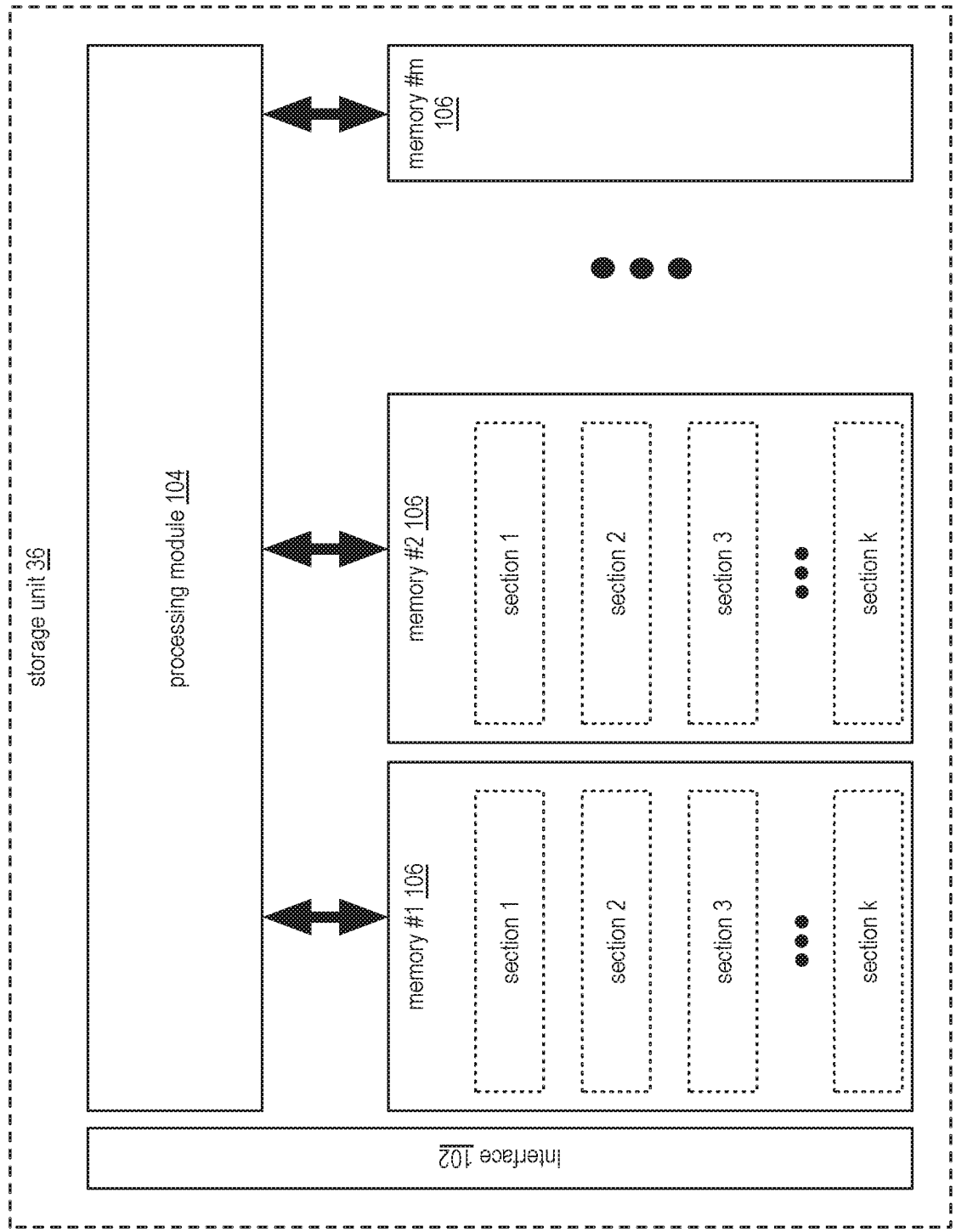
FIG. 9 is a schematic block diagram of an example of a storage unit for a distributed storage network in accordance with the present invention.

FIG. 9 is a schematic block diagram of an embodiment of a storage unit (SU) 36 from FIG. 1. In this example SU 36 receives data traffic from the DSN via interface 102. SU 36 includes processing module 104, which manages traffic to and from memory devices 106 #1 through #m, and manages, among other things, control and compaction routines within those memory devices. In an example, processing module 104 monitors one or more indicators of storage efficiency listed above for each of the memory devices 106 in SU 36, including the same indicators for each individual section of the respective memories 106. In a further example, processing module 104 executes a determination function based on one or more of the monitored indicators, and when the determination function meets a threshold, processing module 104 can execute a compaction routine. The determination function can take into account the various monitored indicators, along with additional network and SU performance factors to manage the timing and execution rate of the compaction routine. In practice, the determination function can utilize a variety of inputs, such as heuristics, probability analysis, learned behavior and cognitive system analysis to determine optimal thresholds. In an example, the determination function can be triggered manually by a client or network manager.

In an example, processing module 104 of storage unit 36 executes a determination function and determines that section 1 of memory #1 106 meets the threshold for compaction. The threshold can be a based on a single factor, such one of those factors listed above, where the processing module 104 compares the factor or factors to predetermined values. Additionally, the processing module 104 can execute another routine or algorithm that takes into account other memory or network factors to adjust the threshold accommodate changes to SU 36 or the DSN. For example, SU 36 may be expanded with the addition of memory devices, or memory devices with additional storage capacity may have been added to SU 36. Additionally, one or more memory devices may be experiencing or may be predicted to experience performance issues necessitating removal from the storage pool. Accordingly, the threshold may be recalculated periodically to accommodate these changes. In an example, when the determination function indicates the compaction is desired the processing module 104 collects a target usage level for the memory device and a current or instantaneous usage level to determine a rate for the compaction routine that will provide desirable read/write performance for the memory device.

In an example, the processing module 104 can use a control loop feedback mechanism, such as a PID controller to take into account an absolute difference between the current usage level and the target usage level, as well as the derivative and integral of that value to determine a relative optimum rate for the compaction routine. The rate the PID function can be based on the formula:

$$u = K_p g + K_i \int g\,dt + K_d \frac{d}{dt} g$$

wherein $K_p g$ is the difference between a target usage level and the current usage level, $K_i \int g\,dt$ is the integral with respect to time of the target usage level and the current usage level, and $$K_d \frac{d}{dt} g$$

is the derivative with respect to time of the target usage level and the current usage level. The PID controller continuously calculates an error value (g) as the difference between a desired setpoint (target usage rate) and a measured process variable (current usage rate) and applies a correction based on proportional, integral, and derivative terms (denoted P, I, and D respectively).

In practice, the PID controller can be used to throttle the rate at which the compaction routine is executed, thereby reducing the impact the compaction routine has on the performance of read/write and other requests on the memory device. When the processing module 104 is executing a compaction function that is optimizing for a target amount of "wasted" space based on the current usage level (excluding the wasted space), the PID controller may be used to throttle the compaction rate so as to remain at a target usage level. Wasted space can be defined as "invalid data", such as data that is not addressable, data that the storage unit has determined to delete or data that the storage unit has determined to overwrite.

The PID controller takes as input the difference between the current and target usage level, the derivative with respect to time of the current and target usage level, and the integral with respect to time of the current and target usage levels. The PID controller then multiplies each of these three inputs by their own pre-configured constants (gains) and returns the sum of the results as the output. When the preconfigured gains are set properly, the PID controller can effectively output a compaction throttle rate that will converge the current and target wasted space level. For example, if the target usage goal is 90% real data processing and a current usage rate yield 80% real data processing a higher scan rate will be determined by the PID controller to get to the target 90% real data processing goal.

Figure 10B:
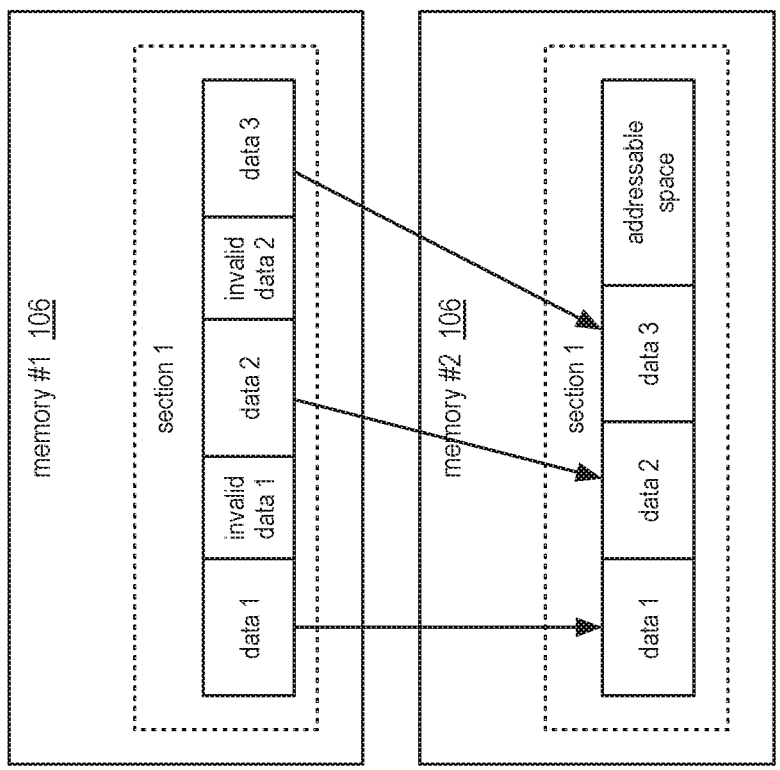
FIG. 10B is a schematic block diagram illustrating another data compaction routine in accordance with the present invention.
Figure 10A:
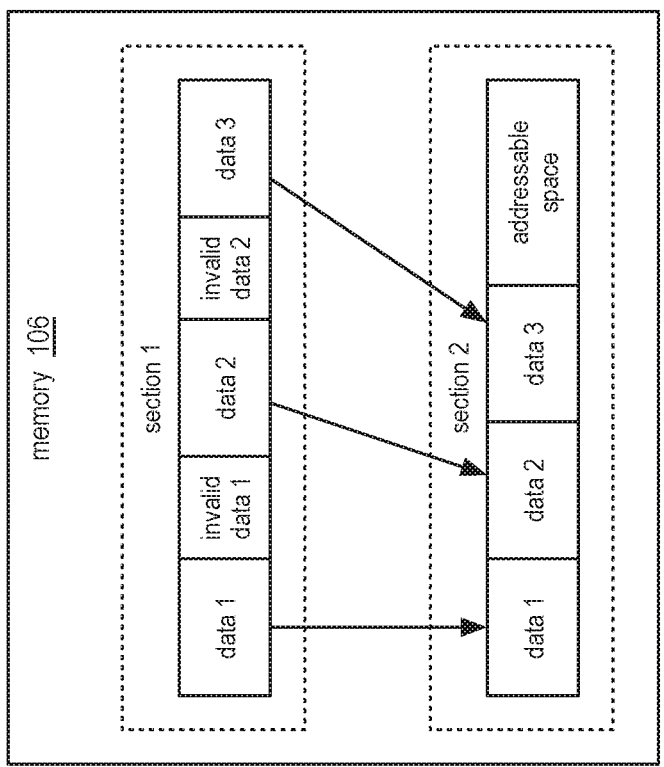
FIG. 10A is a schematic block diagram illustrating a data compaction routine in accordance with the present invention.

FIG. 10A is a schematic block diagram of a memory device 106, such as memory #1 from FIG. 9, illustrating a rudimentary example of data compaction of section 1. In the example, data 1, data 2 and data 3 are read from section 1 of memory 106 and written to section 2 such that the invalid data in section 1 is avoided, allowing for memory space (addressable space) in section 2. Section 1 can then be used for subsequent write operations. FIG. 10B is a schematic block diagram of a memory devices 106, such as memory #1 and memory #2 from FIG. 9, illustrating another rudimentary example of data compaction of section 1. In this example, data 1, data 2 and data 3 are read from section 1 of memory 106 #1 and written to section 1 of memory 106 #2 such that the invalid data in section 1 is avoided, allowing for a net increase in addressable memory space for the SU. Section 1 of memory #1 can then be used for subsequent write operations.

Figure 11:
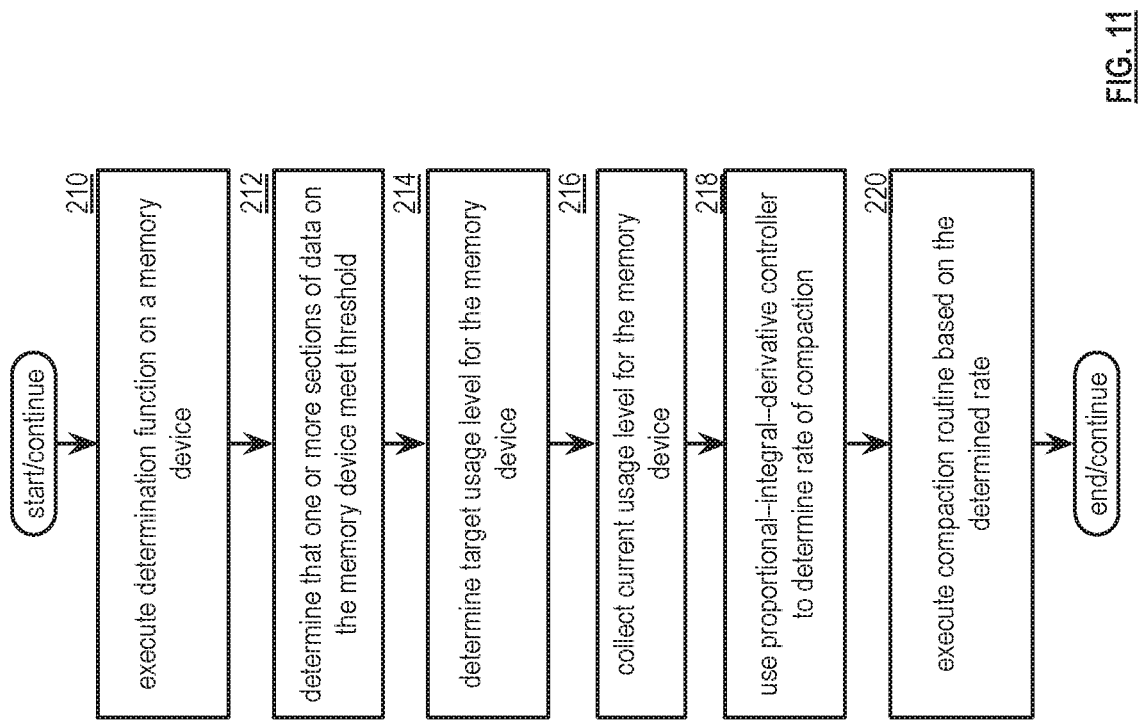
FIG. 11 is an example logic diagram of a method for a data compaction in accordance with the present invention.

FIG. 11 is an example logic diagram of a method for a data compaction routine, where one or more computing devices of a storage unit in a distributed storage network (DSN), receives data for storage in an append-only format. The method begins at step 210, where a processing module of an SU executes a determination function on a SU memory device to determine whether a first section of the memory includes invalid data. The method continues at set 212, where the processing module determines that an amount of invalid data in the first section of the memory device compares unfavorably to a predetermined limit or threshold. In step 214 the processing module determines a target usage level of the memory device and in step 216 the processing module collects the current usage level of the memory device.

The method continues at step 218 where the processing module determines an execution rate for the data compaction routine based on a proportion, integral and derivative (PID) function that is based on the target usage level of the memory and a current usage level of the memory. At step 220 the processing module executes the compaction routine based no the output of the PID function.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A storage unit (SU) comprising:
an interface configured to interface and communicate with a dispersed or distributed storage network (DSN);
memory that stores operational instructions; and
processing circuitry operably coupled to the interface and to the memory, wherein the processing circuitry is configured to execute the operational instructions to:
receive data from at least one computing device within the DSN, wherein at least a portion of the data is based on append-only formatting;
store the data in the memory;
determine whether the memory includes invalid data;
based on a determination that the memory includes invalid data, determine whether an amount of invalid data included in the memory compares unfavorably to a predetermined limit; and
based on a determination that the amount of invalid data compares unfavorably to the predetermined limit, determine a first rate that is based on reading at least a first portion of valid data from the memory and writing the at least the first portion of valid data to a section of the memory, wherein the first rate is also based on a proportion, integral and derivative (PID) function that is based on a target usage level of the memory and a current usage level of the memory.

2. The storage unit of claim 1, wherein the PID function is based on a difference between a target usage level of the memory and a current usage level of the memory, a derivative of the target usage level and the current usage level with respect to time, and an integral with respect to time of the target usage level and the current usage level.

3. The storage unit of claim 1, wherein the PID function is based at least partially on the formula:

$$u = K_p g + K_i \int g \, dt + K_d \frac{d}{dt} g$$

wherein $K_p g$ is a difference between a target usage level and the current usage level, $K_i \int g \, dt$ is a integral with respect to time of the target usage level and the current usage level, and $$K_d \frac{d}{dt} g$$

is a derivative with respect to time of the target usage level and the current usage level.

4. The storage unit of claim 1, wherein the invalid data is at least one of data that is not addressable, data that the storage unit has determined to delete and data that the storage unit has determined to overwrite.

5. The storage unit of claim 1, wherein the predetermined limit is based at least partially on a ratio of the amount of invalid data to valid data stored in the memory.

6. The storage unit of claim 1, wherein the predetermined limit is based at least partially on a total quantity of invalid data stored in the memory.

7. The storage unit of claim 1, wherein the predetermined limit is based at least partially on a percentage of fragmentation of at least a portion of the data stored in the memory, wherein fragmentation is defined as invalid data interspersed with valid data.

8. The storage unit of claim 1, wherein the target usage level is based at least partially on a ratio of valid to invalid data stored in the memory.

9. The storage unit of claim 1, wherein the predetermined limit is based at least partially on a ratio of storage capacity to storage utilization for the memory.

10. The storage unit of claim 1, wherein the append-only formatting is based at least partially on a log structured format.

11. The storage unit of claim 1, wherein the storage unit is located at a first premises that is remotely located from a second premises of at least one other storage unit of a plurality of storage units within the DSN.

12. The storage unit of claim 1, wherein the DSN includes at least one of a wireless communication system, a wire lined communication system, a non-public intranet system, a public internet system, a local area network (LAN), or a wide area network (WAN).

13. A method for execution by one or more computing devices of a storage unit in a distributed storage network (DSN), the method comprises:
   receiving data from at least one computing device within the DSN, wherein at least a portion of the data is based on append-only formatting;
   storing the data in a memory;
   determining whether the memory includes invalid data;
   based on a determination that the memory includes invalid data, determining whether an amount of invalid data included on the memory compares unfavorably to a predetermined limit; and
   based on a determination that the amount of invalid data compares unfavorably to the predetermined limit, determining a first rate that is based on reading at least a first portion of valid data from the first section of the memory and writing the at least the first portion of valid data to a section of the memory, wherein the first rate is also based on a proportion, integral and derivative (PID) function that is based on a target usage level of the memory and a current usage level of the memory.

14. The method of claim 13, wherein the PID function is based on a difference between a target usage level of the memory and a current usage level of the memory, a derivative of the target usage level and the current usage level with respect to time, and an integral with respect to time of the target usage level and the current usage level.

15. The method of claim 13, wherein invalid data is at least one of data that is not addressable, data that the storage unit has determined to delete and data that the storage unit has determined to overwrite.

16. A storage unit (SU) comprising:
   an interface configured to interface and communicate with a dispersed or distributed storage network (DSN);
   a plurality of memory devices configured to store data received from a plurality of computing devices within the DSN;
   memory that stores operational instructions; and
   processing circuitry operably coupled to the interface and to a first memory device of the plurality of memory devices, wherein the processing circuitry is configured to execute the operational instructions to:
      receive data from at least one computing device within the DSN, wherein at least a portion of the data is based on append-only formatting;
      store the data in the first memory device;
      determine whether a first memory device includes invalid data;
      based on a determination that the first memory device includes invalid data, determine whether an amount of invalid data included on the first memory device compares unfavorably to a predetermined limit; and
      based on a determination that the amount of invalid data compares unfavorably to the predetermined limit, determine a first rate that is based on reading at least a first portion of valid data from a first section of the first memory device and writing the at least the first portion of valid data to a second memory device, wherein the first rate is also based on a proportion, integral and derivative (PID) function that is based on a target usage level of the memory and a current usage level of the first memory device.

17. The storage unit of claim 16 wherein the PID function is based on a difference between a target usage level of the memory and a current usage level of the first memory device, a derivative of the target usage level and the current usage level with respect to time, and an integral with respect to time of the target usage level and the current usage level.

18. The storage unit of claim 16, wherein invalid data is at least one of data that is not addressable, data that the storage unit has determined to delete and data that the storage unit has determined to overwrite.

19. The storage unit of claim 16, wherein the predetermined limit is based at least partially on a ratio of the amount of invalid data to valid data stored in the first memory device.

20. The storage unit of claim 16, wherein the predetermined limit is based at least partially on a ratio of storage capacity to storage utilization for the first memory device.

* * * * *